United States Patent [19]
Kawamura et al.

[11] 4,218,120
[45] Aug. 19, 1980

[54] ELECTROCHROMIC LIGHT REGULATOR

[75] Inventors: Kunio Kawamura; Mitsuo Yasukuni; Takashi Iida, all of Sakai; Yuziro Suzuki, Izumi, all of Japan

[73] Assignee: Minolta Camera Kabushiki Kaisha, Japan

[21] Appl. No.: 1,781

[22] Filed: Jan. 8, 1979

[30] Foreign Application Priority Data

Jan. 17, 1978 [JP] Japan .................................. 53-3977

[51] Int. Cl.² .............................................. G03B 9/56
[52] U.S. Cl. ................................................ 354/227
[58] Field of Search ....................................... 354/227

[56] References Cited

U.S. PATENT DOCUMENTS

| | | | |
|---|---|---|---|
| 3,476,029 | 11/1969 | Schreckendgust | 354/227 |
| 3,955,208 | 5/1976 | Wick et al. | 354/227 |
| 4,054,890 | 10/1977 | Shimomura | 354/227 |

FOREIGN PATENT DOCUMENTS

| | | | |
|---|---|---|---|
| 2428012 | 1/1976 | Fed. Rep. of Germany | 354/227 |
| 2620173 | 11/1976 | Fed. Rep. of Germany | 354/227 |
| 2630593 | 2/1977 | Fed. Rep. of Germany | 354/227 |

*Primary Examiner*—Donald A. Griffin
*Attorney, Agent, or Firm*—Wenderoth, Lind & Ponack

[57] ABSTRACT

An electrochromic light regulator for adjusting or regulating the amount of light passing therethrough comprises first, second and third electrode units stacked one above the other in spaced manner. A space between each adjacent two of the first to third transparent electrode units contains an electrochromic material and an ion conducting and electrically insulating layer. The second transparent electrode unit which is positioned intermediately between the first and third transparent electrode units serves as a counter electrode common to the first and third transparent electrode means.

7 Claims, 8 Drawing Figures

ELECTROCHROMIC LIGHT REGULATOR

BACKGROUND OF THE INVENTION

The present invention generally relates to a light regulator for adjusting the amount of light passing therethrough and, more particularly, to an electro-optical regulator utilizing the phenomenon of electrochromism for regulating the amount of light passing therethrough.

The U.S. Pat. No. 3,476,029, patented on Nov. 4, 1969, discloses the use of an electrochromic cell as a shutter mechanism or a diaphragm mechanism, or a combination thereof, for a photographic camera. The electrochromic cell disclosed in the above numbered U.S. patent comprises an electrochromic material normally opaque to light placed between transparent plates each bearing a transparent electrode arrangement on its inner surface. The respective electrode arrangement employed in the electrochromic cell referred to above is constituted by either a central transparent electrode and a plurality of ring-shaped transparent electrodes arranged coaxially with the central electrode and positioned in a coaxially spaced relation to each other or by a plurality of substantially rectangular transparent electrodes arranged in a spaced parallel relation to each other. This cell is so designed that, when an electric potential is applied between pairs of the electrodes on the respective transparent plates, the electrochromic material sandwiched between the pairs of the electrically energized electrodes becomes transparent so that light can pass completely through the electrochromic cell.

However, the three types of electrochromic light regulators shown respectively in FIGS. 1 and 2, FIG. 3 and FIG. 4 of the accompanying drawings are well known to those skilled in the art. The electrochromic light regulator having the construction shown in FIGS. 1 and 2 and generally identified by 10 comprises a transparent substrate 11 having one surface covered with a common transparent electrode 12, made of an electroconductive material such as $SnO_2$ or $In_2O_3$ and formed by the use of a known etching technique or a known metal vapor bonding technique, and an electrochromic layer 13 overlaying the common electrode 12 and made of a transition metal oxide such as $WO_3$ or $MoO_3$. The electrochromic light regulator further comprises a transparent central electrode 14 having a substantially disc-like shape, and a plurality of, for example three, substantially annular transparent electrodes 15, 16 and 17 coaxially encircling the central electrode 14 and one encircling the other in a spaced manner, all of these electrodes 14 to 17 lying in one and the same plane, and an ion conducting and electrically insulating layer 18 made of a material such as SiO, $SiO_2$ or $MgF_2$ and positioned between the electrochromic layer 13 and the electrodes 14 to 17.

The electrochromic light regulator having the construction shown in FIG. 3 is similar to that shown in FIG. 1 and 2, except that the common electrode 12 and the central and annular electrodes 14 to 17 are reversed in position.

In both types of the electrochromic light regulators shown respectively in FIGS. 1 and 2 and in FIG. 3, as best shown in FIG. 1, each of the annular electrodes 15 to 17 in reality has a split-ring shape and has, therefore, a gap between its opposed ends. For the purpose of external electric connection, each of the annular electrodes 15 to 17 has a lead-out conductive strip 15a, 16a or 17a extending radially outward from one of the opposed ends thereof. Similarly, the central electrode 14 having a substantially circular shape has a lead-out conductive strip 14a extending radially outward therefrom in spaced and parallel relation to the conductive strips 15a, 16a and 17a and terminating at a position outside of the outermost annular electrode 17 after having passed through the respective gaps between the opposed ends of the annular eletrodes 15 to 17.

In this construction, when an electric voltage is applied between the common electrode 12 and one or more of the annular electrodes 15 to 17, the portion or portions of electrochromic layer 13 located between the common electrode 12 and such one or more of the annular electrodes 15 to 17 becomes colored and, in particular, the portion or portions of electrochromic layer 13 corresponding to the location of such one or more of the electrodes 15 to 17 becomes colored in a split-ring configuration, leaving an uncolored area between the opposed ends of the annular electrodes. By way of example, if an electric voltage is applied between terminals E and Z, the portion of electrochromic layer 13 corresponding to the location of the annular electrode 17 becomes colored. In this condition, the gap between the opposed ends of the annular electrode 17 through which the lead-out conductive strips 14a, 15a and 16a from the associated electrodes 14 to 16 extend remains uncolored. This is not only uncomfortable for a person to look upon, but also provides an uneven performance in light control in that the portion of the light passing through the gap between the opposed ends of the electrodes, which remains uncolored, cannot be intercepted.

Moreover, in view of the fact that not only does each of the annular electrodes 15 to 17 have a potential gradient, but also the resistance between each of the electrodes 15 to 17 and the common electrode 12 is very high, coloration of the electrochromic layer 13 when activated by the applied voltage starts from a portion corresponding to the lead-out conductive strip 15a, 16a or 17a where the voltage is first applied, and progresses towards the portion corresponding to the opposed end of such annular electrode remote from the lead-out conductive strip 15a, 16a or 17a. This means that a time is required for the portion of electrochromic layer 13 corresponding to the annular electrode to complete its coloration over its entire length. This process of coloration at first results in variation in optical density between the opposed end portions of the same electrode. In order for the portion of electrochromic layer 13 corresponding the same electrode to be completely colored, the conventional light regulator requires a relatively large electric potential be supplied, which in turn prevents the use of a relatively low, and therefore economical, drive voltage for driving the light regulator.

However, the disadvantages of slow response, variation in optical density and the incapability of using a low drive voltage, inherent in the light regulator having the construction shown in either FIGS. 1 and 2 or FIG. 3 can be substantially eliminated by providing additional lead-out conductive strips, such as shown by 15b, 16b and 17b in FIG. 4, in the respective ends of the annular electrodes 15 to 17 remote from the lead-out conductive strips 15a, 16a and 17a. However, even in the contemplated arrangement shown in FIG. 4, there is still a disadvantage in that the light passing through one or more gaps between the opposed ends of the electrically activated annular electrodes cannot be intercepted as is the case with the conventional light regulator of the construction shown in either FIGS. 1 and or 2 and FIG. 3.

Furthermore, where a relatively high contrast is required between the colored and uncolored portions of the electrochromic layer, the conventional light regulator cannot produce a contrast value higher than that attained when the coloration of the colored portion is saturated to the maximum optical density.

SUMMARY OF THE INVENTION

Accordingly, the present invention has as its essential object to provide an improved electrochromic light regulator which substantially avoids the disadvantages inherent in the conventional device of a similar kind.

Another important object of the present invention is to provide an improved electrochromic light regulator of the type referred to above which is satisfactory for control of light adapted to pass therethrough.

A further object of the present invention is to provide an improved electrochromic light regulator of the type referred to above, in which the response time for coloration is improved, the application of a relatively low voltage is enabled, the density of the colored portion is increased and unified, and areas which are unwillingly incapable of being colored are decreased or eliminated.

According to the present invention, there is provided an electrochromic light regulator utilizing the phenomenon of electrochromism in adjusting or regulating the amount of light passing therethrough. The light regulator according to the preferred embodiments of the present invention comprises first, second and third electrode means stacked one above the other in a spaced manner. A space between each adjacent pair of the first to third electrode means, for example, between the first and second electrode means and between the second and third electrode means, contains an electrochromic material and an ion conducting and electrically insulating layer. The second electrode means which is positioned intermediately between the first and third electrode means serves as a counter electrode common to the first and third electrode means, which are electrically connected to each other, such that coloring can take place simultaneously between the first and second electrode means and between the second and third electrode means.

BRIEF DESCRIPTION OF THE DRAWINGS

These and other objects and features of the present invention will become apparent from the following description of the preferred embodiments thereof with reference to the accompanying drawings, in which.

DETAILED DESCRIPTION OF THE INVENTION

Figure 1:
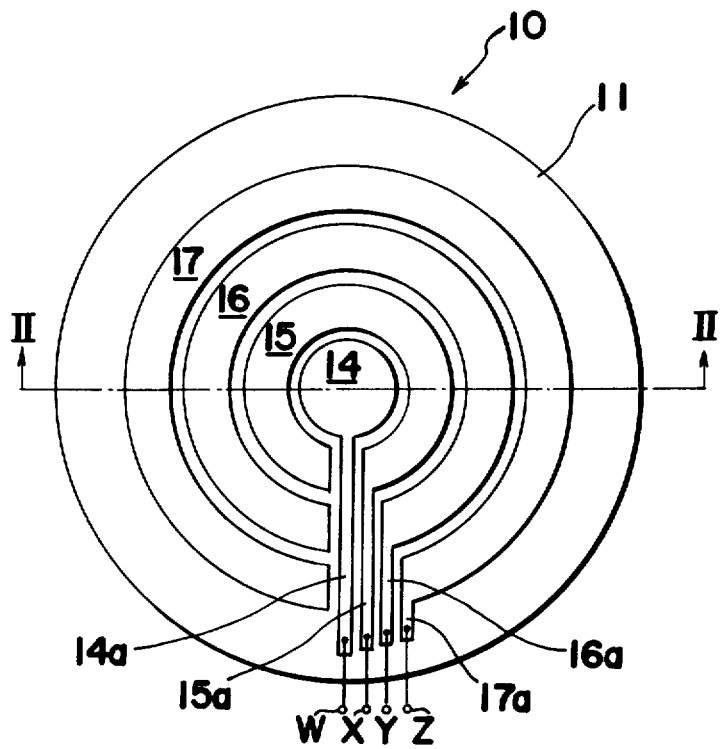
FIG. 1 is an elevational view of one type of the conventional electrochromic light regulators.
Figure 2:
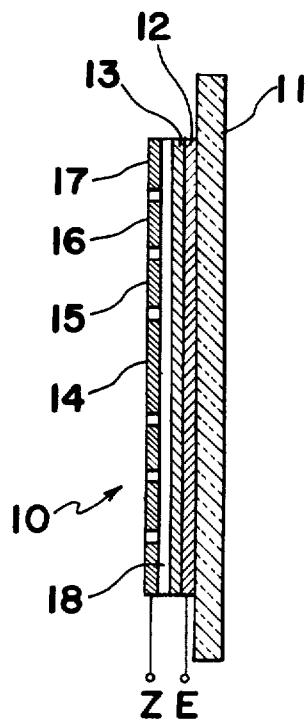
FIG. 2 is a cross sectional view taken along the line II—II in FIG. 1.
Figure 4:
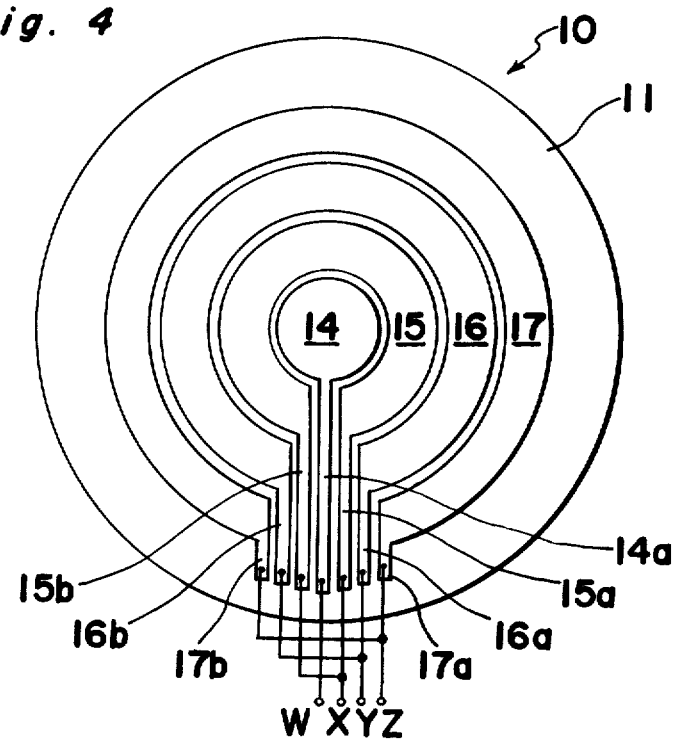
FIG. 4 is an elevational view of a still another type of the conventional electrochromic light regulators.
Figure 3:
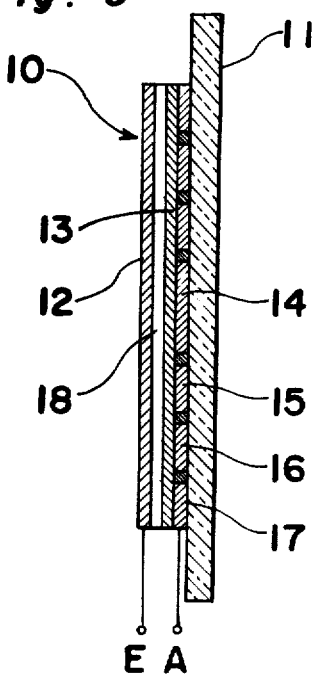
FIG. 3 is a view similar to FIG. 2, showing another type of the conventional electrochromic light regulators.

Before the description of the present invention proceeds, note that like parts are designated by like reference numerals throughout the accompanying drawings.

Figure 5:
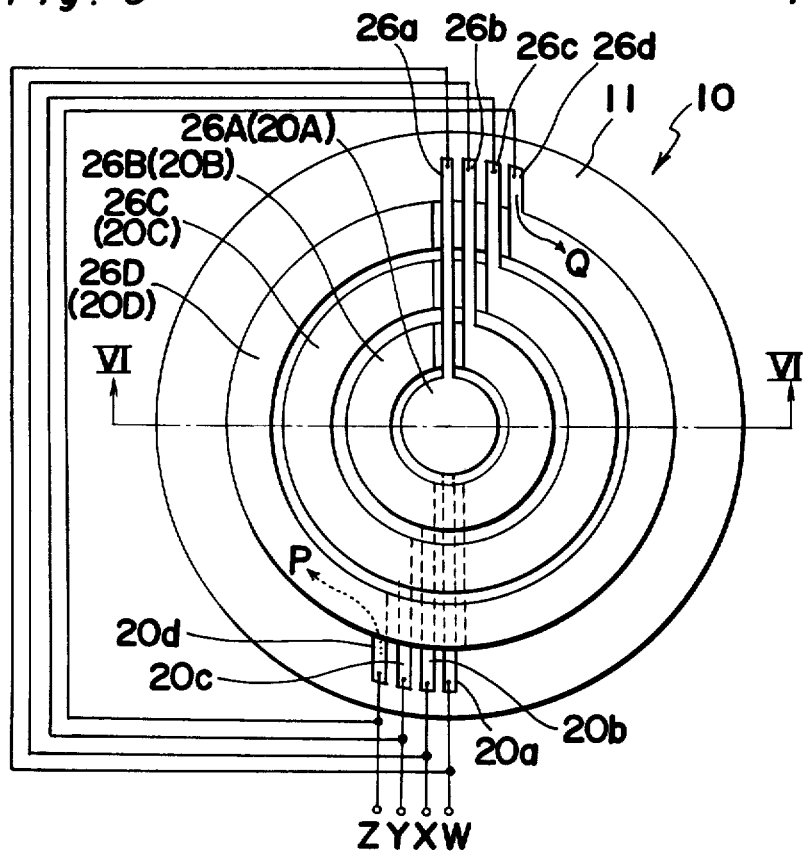
FIG. 5 is an elevational view of an electrochromic light regulator according to one preferred embodiment of the present invention.
Figure 6:
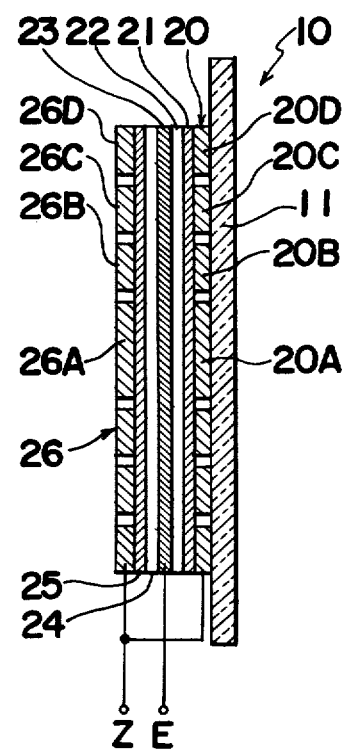
FIG. 6 is a cross sectional view taken along the line VI—VI in FIG. 5.

Referring to FIGS. 5 and 6, an electrochromic light regulator 10 according to one preferred embodiment of the present invention is fabricated by forming in sequence a first transparent electrode unit 20 of any known electroconductive and transparent material, such as $In_2O_3$ or $SO_2$, on one surface of the transparent substrate 11, such as a transparent glass plate, by the use of any known etching technique or any known metal vapor bonding technique; a first layer 21 of electrochromic material, for example, a transition metal oxide such as $WO_3$ or $MoO_3$, on the first transparent electrode unit 20; a first ion conducting and electrically insulating layer 22 of a material such as SiO, $SiO_2$ or $MgF_2$, on the first electrochromic layer 21; a second transparent electrode layer 23 on the first ion conducting and electrically insulating layer 22; a second ion conducting and electrically insulating layer 24 on the second transparent electrode layer 23; a second layer 25 of electrochromic material on the second ion conducting and electrically insulating layer; and a third transparent electrode unit 26 on the second electrochromic layer 25. The first and third electrode units 20 and 26 are each concentrically divided; the first and second electrochromic layers 21 and 25 are each divided in the same manner as the first and third electrode units or formed as a continuous layer, and the second electrode units 23 and the first and second ion conducting layer 22 and 24 are each formed as a continuous layer.

As best shown in FIG. 5, the first and third transparent electrode units 20 and 26 are of identical construction and are each constituted by a circular central electrode 20A or 26A and a plurality of, for example, three, annular electrodes 20B, 20C and 20D or 26B, 26C and 26D having a substantially split-ring shape. The annular electrodes 20B, 20C and 20D or 26B, 26C and 26D of each of the first and third transparent electrode units 20 and 26 have different and gradually varying diameters so that the annular electrode 20B or 26B can encircle the central electrode 20A or 26A in spaced relation thereto; the annular electrode 20C or 26C can encircle the annular electrode 20B or 26B in spaced relation thereto; and the annular electrode 20D or 26D can encircle the annular electrode 20C or 26C in spaced relation thereto, respectively.

For a reason which will become understood from the subsequent description, the opposed ends of the annular electrode 20D are spaced a distance which is greater than the distance between the opposed ends of the annular electrode 20C which is in turn greater than the distance between the opposed ends of the annular electrode 20B. Similarly, the opposed ends of the annular electrode 26D are spaced a distance which is greater than the distance between the opposed ends of the annular electrode 26C which is in turn greater than the distance between the opposed ends of the annular electrode 26B.

The central electrode 20A has a lead-out conductive strip 20a extending radially outward therefrom and terminating outside of the outermost annular electrode 20D after having passed through an inner gap between the opposed ends of the annular electrode 20B, then an intermediate gap between the opposed ends of the annular electrode 20C, and finally an outer gap between the opposed ends of the annular electrode 20D. The annular electrodes 20B, 20C and 20D of the first transparent electrode unit 20 are also formed with respective lead-out conductive strips 20b, 20c and 20d at one end extending in spaced and parallel relation to each other and also to the lead-out conductive strip 20a.

Similarly, the central electrode 26A has a lead-out conductive strip 26a extending radially outward therefrom and terminating outside of the outermost annular electrode 26D after having passed through an inner gap between the opposed ends of the annular electrode 26B, then an intermediate gap between the opposed ends of the annular electrode 26C, and finally an outer gap between the opposed ends of the annular electrode 26D. The annular electrodes 26B, 26C and 26D of the third transparent electrode unit 26 are also formed with respective lead-out conductive strips 26b, 26c and 26d at one end extending in spaced and parallel relation to each other and also to the lead-out conductive strip 26a.

The first and third transparent electrode units 20 and 26, each having the construction as hereinbefore described, are so coaxially arranged that the group of the lead-out conductive strips 20a, 20b, 20c and 20d of the respective electrodes 20A, 20B, 20C and 20D of the first transparent electrode unit 20 and the group of the lead-out conductive strips 26a, 26b, 26c and 26d of the respective electrodes 26A, 26B, 26C and 26D of the third transparent electrode unit 26 are displaced or offset a certain angle with respect to each other about the center of either of the central electrodes 20A and 26A. So far illustrated, these groups of the lead-out conductive strips 20a to 20d and 26a to 26d are shown as displaced or offset 180° with each other so as to extend respectively in radially opposite directions. However, the offset angle of the groups of the lead-out conductive strips 20a to 20d and 26a to 26d need not always be limited to 180° such as shown, but may be any angle unless they overlap with each other.

The lead-out conductive strips 20a to 20d of the associated electrodes 20A to 20D of the first transparent electrode unit 20 are so electrically connected to the respective lead-out conductive strips 26a to 26d of the associated electrodes 26A to 26D of the third transparent electrode unit 26, which are in turn electrically connected to input terminals Z, Y, X and W, that when an electric drive voltage is applied between the input terminal E, electrically connected to the second electrode layer 23, and any one of the input terminals W, X, Y and Z, portions of the electrochromic layers 21 and 25 located between the second electrode layer 23 and a corresponding pair of electrodes 20A and 26A, 20B and 26B, 20C and 26C or 20D and 26D can be simultaneously activated to assume a colored state. The wiring necessary to connect the electrodes 20A to 20D to the associated electrodes 26A to 26D in the manner described above may be installed either external to the light regulator 10 or on the peripheral margin of the transparent substrate 11 at a position outside of the outermost annular electrodes 20D and 26D.

The operation of the electrochromic light regulator 10 having the construction described with reference to and shown in FIGS. 5 and 6 will now be described. However, note that, for the sake of brevity, the drive voltage will be described as applied only to the input terminals E and Z.

Assuming that the terminals E and Z are respectively connected to positive and negative drive voltage sources, the portion of electrochromic layer 21 located between the second electrode layer 23 and the annular electrode 20D and the portion of electrochromic layer 25 located between second electrode 23 and the annular electrode 26D becomes colored. The light regulator 10 consequently displays a complete ring-shaped pattern represented by the combined contour of the annular electrodes 20D and 26D. More specifically, so far as the coloring of the first electrochromic layer 21 is involved, there is produced a potential difference distribution in the annular electrode 20D because of its surface resistance. This causes an electric potential difference between the lead-out conductive strip 20d and the second electrode layer 23 greater than the potential difference between the end of the annular electrode 20D remote from the lead-out conductive strip 20d and the second electrode layer 23, and thus coloration progresses from the lead-out conductive strip 20d towards the end of the annular electrode 20D remote from the lead-out conductive strip 20d in a manner as shown by the arrow P. By the same token, coloration of the annular electrode 26D of the third transparent electrode 26 takes place from the lead-out conductive strip 26d towards the end of the annular electrode 26D remote from the lead-out conductive strip 26d in a manner as indicated by the arrow Q.

The superiority of the electrochromic light regulator of the construction shown in FIGS. 5 and 6 to the conventional electrochromic light regulators will now be described.

Assuming that the conventional light regulators require a certain time T (sec.) for any pattern to complete coloration to its saturated condition with the contrast ratio between the colored and uncolored portions being x:1, the light regulator according to the present invention requires a time T/2 (sec.) for such a pattern to be colored to such an extent as to give the contrast ratio of x:1 and can produce a contrast ratio of $x^2$:1 at the time of completion of full coloration of the pattern. Therefore, as compared with the conventional light regulators, the light regulator of the present invention is fast in response time and produces a relatively high contrast between the colored and uncolored portions of pattern. Moreover, because of the combination of the first and second electrochromic layers with their lead-out strips for the electrodes displaced by 180 degrees, the light regulator according to the present invention is free from the variation in contrast as often observed in the conventional light regulators between the portion of the electrochromic layer at the lead-out conductive strip of any one of the annular electrodes and another portion at the end of the annular electrode remote from such lead-out conductive strip.

Yet, while the conventional light regulator requires the application of a certain drive voltage for attaining the contrast ratio of x:1, the light regulator according to the present invention achieves the same contrast ratio with the application of a drive voltage lower than that required in the conventional light regulators.

From the foregoing, it has now become clear that even though there is a gap between the opposed ends of any one of the annular electrodes of either one of the first and third transparent electrode units 20 and 26 for the passage of the lead-out conductive strips therethrough, a discontinuity in the colored pattern as is true of the conventional light regulators is substantially avoided in the light regulator of the present invention because this gap is backed up by the corresponding annular electrode of the other of the first and third transparent electrode units 20 and 26. In this respect, the light regulator according to the present invention is effective to intercept rays of light which may pass through the gap between the opposed ends of the annular electrodes such as is the case with the conventional light regulators.

In the foregoing description of the light regulator according to the first preferred embodiment of the present invention, the first and third transparent electrode units 20 and 26 have been described as having an identical construction. However, the electrodes of the first and third transparent electrode units may have different sizes if it is desired to intercept rays of light which may pass through the circular gap between the adjacent pairs of the electrodes. This will now be described with particular reference to FIGS. 7 and 8.

Figure 7:
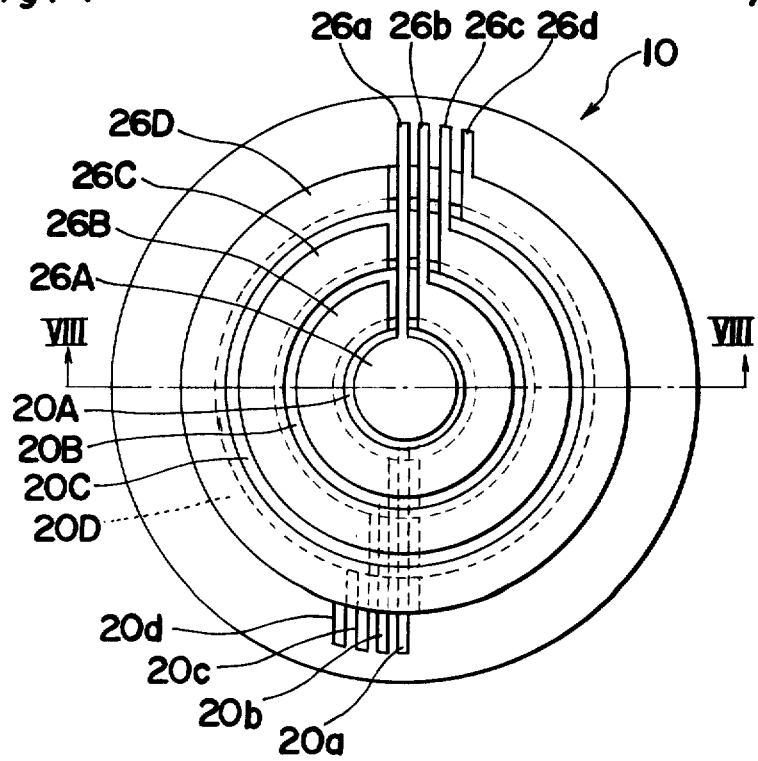
FIG. 7 is an elevational view of an electrochromic light regulator according to another preferred embodiment of the present invention.
Figure 8:
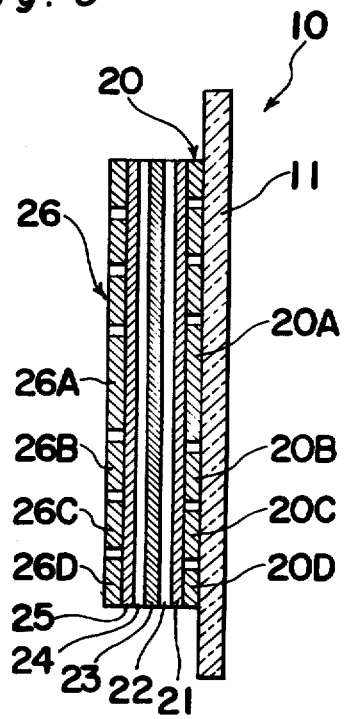
FIG. 8 is a cross sectional view taken along the line VIII—VIII in FIG. 7.

As shown in FIGS. 7 and 8, the central electrode 20A is shown as having a greater diameter than that of the central electrode 26A and substantially equal to or slightly greater than the inner diameter of the annular electrode 26B. Correspondingly, the innermost annular electrode 20B has inner and outer diameters greater than the respective inner and outer diameters of the innermost annular electrode 26B; the intermediate annular electrode 20C has inner and outer diameters greater than the respective inner and outer diameters of the intermediate annular electrode 26C; and the outermost electrode 20D has an inner diameter greater than the inner diameter of the outermost electrode 26D, but an outer diameter substantially equal to or slightly greater than that of the outermost electrode 26D.

In the construction shown in FIGS. 7 and 8, it will readily be understood that, assuming that, for example, the pairs of the outermost and intermediate annular electrodes 20D and 26D, and 20C and 26C of the respective first and third transparent electrode units 20 and 26 are simultaneously activated to assume a colored state, there is no possibility that rays of light entering, for example, the circular gap between the outermost annular electrode 26D and intermediate annular electrode 26C is prevented from passing through the circular gap between the outermost annular electrode 20D and intermediate annular electrode 20C since the gaps are radially displaced from each other.

From the foregoing full description of the present invention, it has now become clear that the present invention is effective to provide an improved electrochromic light regulator capable of being easily manufactured by the utilization of any known metal vapor bonding technique without increasing the thickness of the light regulator itself and which is operable with and in quick response to the application of a relatively low electric drive voltage and provides a relatively high contrast between the colored and uncolored portions.

Although the present invention has been fully described in conjunction with the preferred embodiments thereof with reference to the accompanying drawings, note that various changes and modifications are apparent to those skilled in the art. By way of example, while each of the first and second ion conducting and electrically insulating layers 22 and 24 and the second transparent electrode layer 23 has a circular shape having a diameter equal to, or substantially equal to, the outer diameter of either of the outermost annular electrodes 20D and 26D, either of the first and second electrochromic layers 21 and 25 may be in the form of either a single circular layer similar to the layers 22, 23 and 24 or a corresponding number of substantially ring-shaped layers similar to one of the electrode units 20 and 26.

Moreover, depending upon the purpose for which the light regulator according to the present invention is used, the lead-out conductive strips 20a to 20d of the first transparent electrode unit 20 may not be electrically connected to the lead-out conductive strips 26a to 26d of the third transparent electrode unit 26, but may be connected to a source of drive voltage different from that to which the lead-out conductive strips 26a to 26d are connected.

Furthermore, the electrodes of either of the first and third transparent electrode units 20 and 26 may have any desired shape other than the substantially circular shape such as shown, for example, square, a rectangular, a polygonal or a star-like shape. In addition, the electrodes of either of the first and third transparent electrode units 20 and 26 may be in the form of a square or rectangular plate-like shape, in which case they may be arranged side by side with respect to each other in contrast to the coaxial arrangement shown in FIGS. 5 and 7.

Therefore, these changes and modifications are to be understood as included within the true scope of the present invention unless they depart therefrom.

What we claim is:

1. An electrochromic light regulator which comprises, in combination:
   first and second electrochromic layers arranged in alignment with each other on the same optical path;
   a first electrode means constituted by a plurality of transparent electrodes disposed adjacent to said first electrochromic layer for controlling coloration of said first electrochromic layer, said electrodes of said first electrode means being arranged in a first predetermined pattern and electrically insulated from each other, said electrodes of said first electrode means having respective lead-out conductive strips extending outwards therefrom;
   a second electrode means constituted by a plurality of transparent electrodes disposed adjacent to said second electrochromic layer for controlling coloration of said second electrochromic layer, said electrodes of said second electrode means being arranged in a second predetermined pattern and electrically insulated from each other, said electrodes of said second electrode means having respective lead-out conductive strips extending outwards therefrom; and
   said lead-out conductive strips of said electrodes of said first electrode means and said lead-out conductive strips of said electrodes of said second electrode means being arranged in an offset manner relative to each other.

2. An electrochromic light regulator as claimed in claim 1, wherein said electrodes of the first and second electrode means are arranged to form a combined pattern, and said lead-out conductive strips of said first and second electrode means are respectively located at the opposite sides of said combined pattern.

3. An electrochromic light regulator for controlling the pattern through which light is transmitted comprising in combination:
- a first transparent electrode means comprising a plurality of electrodes disposed in a first pattern and insulated from each other by electrically insulating spaces disposed therebetween;
- a first electrochromic layer disposed adjacent to said first transparent electrode means;
- a first ion conducting and electrically insulating layer disposed adjacent to said first electrochromic layer opposite said first transparent electrode means;
- a second transparent electrode means disposed adjacent to said first ion conducting and electrically insulating layer opposite said first electrochromic layer;
- a second ion conducting and electrically insulating layer disposed adjacent to said second transparent electrode means opposite said first ion conducting and electrically insulating layer;
- a second electrochromic layer disposed adjacent to said second ion conducting and electrically insulating layer opposite said second transparent electrode means; and
- a third transparent electrode means disposed adjacent to said second electrochromic layer opposite said second ion conducting and electrically insulating layer comprising a plurality of electrodes disposed in a second pattern and insulated from each other by electrically insulating spaces disposed therebetween, whereby the pattern through which light is transmitted is controlled by selective electrical energization of said plurality of electrodes comprising said first and third electrode means.

4. An electrochromic light regulator as claimed in claim 3, wherein:
each of said plurality of electrodes comprising said first and third electrode means includes a conductive lead-out extension for electric connection with an external electric circuit, said conductive lead-out extensions of said plurality of electrodes of said first electrode means disposed adjacent to each other and said conductive lead-out extensions of said plurality of electrodes of said third electrode means disposed adjacent to each other and displaced from said conductive lead-out extensions of said plurality of electrodes of said first transparent electrode means.

5. An electrochromic light regulator as claimed in claim 4, wherein:
said first pattern of electrodes of said first electrode means is displaced from said second pattern of electrodes of said third electrode means, whereby said electrically insulating spaces of said first pattern do not overlap said electrically insulating spaces of said second pattern.

6. An electrochromic light regulator as claimed in claim 3, wherein:
said first pattern of electrodes of said first electrode means is displaced from said second pattern of electrodes of said third electrode means, whereby said electrically insulating spaces of said first pattern do not overlap said electrically insulating spaces of said second pattern.

7. A solid-state electrochromic light regulator comprising: a single transparent substrate; a first transparent electrode means mounted on said transparent substrate; a first combination of an electrochromic layer and an ion conducting and electrically insulating layer mounted on said first transparent electrode; a second transparent electrode means mounted on said first combination; a second combination of an electrochromic layer and an ion conducting and electrically insulating layer mounted on said second transparent electrode means; and a third transparent electrode means mounted on said second combination, whereby said first, second and third electrode means and said first and second combinations are supported by one side of said single transparent substrate only.

* * * * *